US008166311B1

(12) United States Patent
Smith et al.

(10) Patent No.: US 8,166,311 B1
(45) Date of Patent: Apr. 24, 2012

(54) METHODS AND SYSTEMS FOR PROMOTING AUTHENTICATION OF TECHNICAL SERVICE COMMUNICATIONS IN A TELECOMMUNICATIONS SYSTEM

(75) Inventors: Steven G. Smith, Roswell, GA (US); Roland T. Morton, Jr., Alpharetta, GA (US); Robert H. Willis, Jr., Louisville, KY (US); Mitchell E. Davis, Palmetto, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 930 days.

(21) Appl. No.: 10/175,699

(22) Filed: Jun. 20, 2002

(51) Int. Cl.
H04L 29/06 (2006.01)

(52) U.S. Cl. .............................. 713/185; 726/9; 726/27

(58) Field of Classification Search .................. None
See application file for complete search history.

(56) References Cited

U.S. PATENT DOCUMENTS

| | | | | |
|---|---|---|---|---|
| 4,841,560 | A | * | 6/1989 | Chan et al. .................. 379/29.02 |
| 4,922,516 | A | * | 5/1990 | Butler et al. .................... 379/21 |
| 4,977,399 | A | | 12/1990 | Price et al. |
| 5,528,660 | A | * | 6/1996 | Heins et al. ...................... 379/21 |
| 5,666,481 | A | | 9/1997 | Lewis |
| 5,687,212 | A | * | 11/1997 | Kinser et al. .................. 379/9.03 |
| 5,703,929 | A | * | 12/1997 | Schillaci et al. ................. 379/21 |
| 5,798,733 | A | | 8/1998 | Ethridge |
| 5,880,958 | A | | 3/1999 | Helms et al. |
| 5,881,131 | A | | 3/1999 | Farris et al. |
| 5,896,440 | A | | 4/1999 | Reed et al. |
| 5,897,640 | A | | 4/1999 | Veghte et al. |
| 5,901,284 | A | * | 5/1999 | Hamdy-Swink .................. 726/5 |
| 5,920,846 | A | | 7/1999 | Storch et al. |
| 5,922,040 | A | | 7/1999 | Prabhakaran |
| 5,987,381 | A | | 11/1999 | Oshizawa |
| 5,995,624 | A | * | 11/1999 | Fielder et al. .................. 713/169 |
| 6,061,346 | A | * | 5/2000 | Nordman ....................... 370/352 |
| 6,094,688 | A | * | 7/2000 | Mellen-Garnett et al. ..... 719/328 |

(Continued)

FOREIGN PATENT DOCUMENTS

EP 0 712 227 A2 5/1996

(Continued)

OTHER PUBLICATIONS

Parasuraman et al., "A Model for Types and Levels of Human Interaction with Automation", IEEE, May 2000, pp. 1-12.*

(Continued)

*Primary Examiner* — Eleni Shiferaw
*Assistant Examiner* — Jeffery Williams
(74) *Attorney, Agent, or Firm* — Parks IP Law LLC; Jennifer P. Medlin, Esq.

(57) ABSTRACT

In one embodiment of the present methods and systems, a computer-assisted method is provided for authenticating at least one service related communication with a technician in a telecommunications system. The method includes the steps of receiving at least one of a password and a user identification from an access device employed by the technician; combining a token with at least one of the password and the user identification data to form a combined authentication password; permitting access to the telecommunications system by the technician subject to an authentication of at least the combined authentication password. In another aspect, one embodiment of the present methods may include a service related communication that includes at least one wireless communication. Computer-readable media embodiments and system embodiments associated with the present methods are also provided.

10 Claims, 6 Drawing Sheets

U.S. PATENT DOCUMENTS

| | | | |
|---|---|---|---|
| 6,101,443 | A | 8/2000 | Kato et al. |
| 6,141,609 | A | 10/2000 | Herdeg et al. |
| 6,154,152 | A | 11/2000 | Ito |
| 6,161,182 | A * | 12/2000 | Nadooshan ............ 713/172 |
| 6,167,255 | A | 12/2000 | Kennedy, III et al. |
| 6,185,484 | B1 | 2/2001 | Rhinehart |
| 6,192,314 | B1 | 2/2001 | Khavakh et al. |
| 6,212,635 | B1 * | 4/2001 | Reardon ............ 713/165 |
| 6,246,361 | B1 | 6/2001 | Weill et al. |
| 6,285,931 | B1 | 9/2001 | Hattori et al. |
| 6,332,163 | B1 | 12/2001 | Bowman-Amuah |
| 6,343,290 | B1 | 1/2002 | Cossins et al. |
| 6,389,426 | B1 | 5/2002 | Turnbull et al. |
| 6,427,119 | B1 | 7/2002 | Stefan et al. |
| 6,430,562 | B1 | 8/2002 | Kardos et al. |
| 6,477,526 | B2 | 11/2002 | Hayashi et al. |
| 6,484,092 | B2 | 11/2002 | Seibel |
| 6,505,120 | B2 | 1/2003 | Yamashita et al. |
| 6,516,055 | B1 | 2/2003 | Bedeski et al. |
| 6,526,349 | B2 | 2/2003 | Bullock et al. |
| 6,532,418 | B2 | 3/2003 | Chun et al. |
| 6,678,826 | B1 * | 1/2004 | Kelly et al. ............ 726/2 |
| 6,715,082 | B1 * | 3/2004 | Chang et al. ............ 726/8 |
| 6,721,779 | B1 * | 4/2004 | Maffeis ............ 709/202 |
| 6,865,557 | B1 * | 3/2005 | Cordery et al. ............ 705/60 |
| 6,993,658 | B1 * | 1/2006 | Engberg et al. ............ 713/185 |
| 7,035,854 | B2 * | 4/2006 | Hsiao et al. ............ 1/1 |
| 7,039,714 | B1 | 5/2006 | Blakley, III et al. ......... 709/229 |
| 7,206,936 | B2 * | 4/2007 | Aull et al. ............ 713/173 |
| 7,945,776 | B1 * | 5/2011 | Atzmony et al. ............ 713/165 |
| 2002/0010679 | A1 * | 1/2002 | Felsher ............ 705/51 |
| 2002/0046342 | A1 * | 4/2002 | Elteto et al. ............ 713/185 |
| 2002/0091933 | A1 * | 7/2002 | Quick et al. ............ 713/182 |
| 2002/0120713 | A1 | 8/2002 | Gupta et al. |
| 2003/0200202 | A1 * | 10/2003 | Hsiao et al. ............ 707/3 |
| 2004/0098595 | A1 * | 5/2004 | Aupperle et al. ............ 713/185 |
| 2005/0125677 | A1 * | 6/2005 | Michaelides ............ 713/185 |
| 2007/0043954 | A1 * | 2/2007 | Fox ............ 713/185 |
| 2007/0050635 | A1 * | 3/2007 | Popp ............ 713/185 |
| 2007/0136603 | A1 * | 6/2007 | Kuecuekyan ............ 713/185 |

FOREIGN PATENT DOCUMENTS

| | | |
|---|---|---|
| EP | 0 712 227 A3 | 11/1999 |
| WO | WO 00/02365 | 1/2000 |

OTHER PUBLICATIONS

Borcherding, Malte, "Mobile Security—An Overview of GSM, SAT and WAP", 1999, Springer-Verlag Berlin Heidelberg, pp. 133-141.*

Foreman, et al., "Software Technology Review", Jun. 1997, Carnegie Mellon University, Software Engineering Institute, pp. 1- 22,42-46, 239-246, 321-324.*

"Serial Number", The American Heritage College Dictionary, 4$^{th}$ ed., 2002, Houghton Mifflin Company.*

U.S. Appl. No. 10/032,530, filed Oct. 25, 2001.
U.S. Appl. No. 10/103,045, filed Mar. 21, 2002.
U.S. Appl. No. 10/060,562, filed Jan. 30, 2002.
U.S. Appl. No. 10/074,325, filed Feb. 12, 2002.
U.S. Appl. No. 10/246,188, filed Sep. 18, 2002.
U.S. Appl. No. 10/032,853, filed Oct. 25, 2001.
U.S. Appl. No. 10/445,861, filed May 27, 2003.

* cited by examiner

METHODS AND SYSTEMS FOR PROMOTING AUTHENTICATION OF TECHNICAL SERVICE COMMUNICATIONS IN A TELECOMMUNICATIONS SYSTEM

BACKGROUND

Effective customer service is an essential requirement for commercial enterprises to compete successfully in a conventional worldwide economy. In the telecommunications industry, for example, providing customer service is an important part of sustaining market share in view of multiple competitors in the industry. In addition, to promote revenue growth for a telecommunications entity, for example, it is also important to provide customer service in a cost effective manner. The telecommunications entity needs effective and efficient methods and systems for performing installation and maintenance operations for the services offered to its customers.

Installation and maintenance service technicians working for a telecommunications entity typically need to collect a wide variety of data when performing field service operations for customers of the entity. Service may be performed by these technicians on telecommunications equipment at a variety of customer locations. At the time service is performed, data may be communicated to the technician to assist in performing the service. Data may also be communicated to one or more computer systems employed by the telecommunications entity for analysis and other processing. Such data often include sensitive or private information such as, for example, customer names and addresses, data associated with a customer service, and/or identification data related to telecommunications equipment employed at the service location.

Many conventional processes for communicating service related data in a telecommunications system, however, do not include adequately secure password and communication protection mechanisms. In one process, a service technician obtains access to a telecommunications system by entering information such as a user name, a password and other personal identification information. This information may also include data related to the equipment used by the technician to access the telecommunications system, such as a wireless modem serial number, for example. In general, this information is collected and transmitted to verify the identity and authority of the service technician attempting to access the telecommunications system.

One problem with conventional processes is a lack of full authentication of the service technician as an authorized user within a telecommunications system. Without a higher level of verification, the opportunity exists for unauthorized users to obtain access to the telecommunications system. An unauthorized user may improperly obtain sensitive and private information, introduce a software virus, or otherwise disrupt or damage portions of the telecommunications system. In addition, with regard to permitting wireline or wireless access to networked communications media, such as the Internet or an intranet of the telecommunications entity, a higher level of authentication is required for the technician to access such network resources.

What are needed, therefore, are improved methods and systems for promoting secure and authenticated communication and data collection for service operations performed in a telecommunications system. Such improved methods and systems are required to overcome deficiencies associated with conventional methods and systems.

SUMMARY

In one embodiment of the present methods and systems, a computer-assisted method is provided for authenticating at least one service related communication with a technician in a telecommunications system. The method includes the steps of receiving at least one of a password and a user identification from an access device employed by the technician; combining a token with at least one of the password and the user identification data to form a combined authentication password; permitting access to the telecommunications system by the technician subject to an authentication of at least the combined authentication password. In another aspect, one embodiment of the present methods and systems includes a service related communication that includes at least one wireless communication. Computer-readable media embodiments and system embodiments associated with the present methods are also provided.

DETAILED DESCRIPTION

Figure 1:
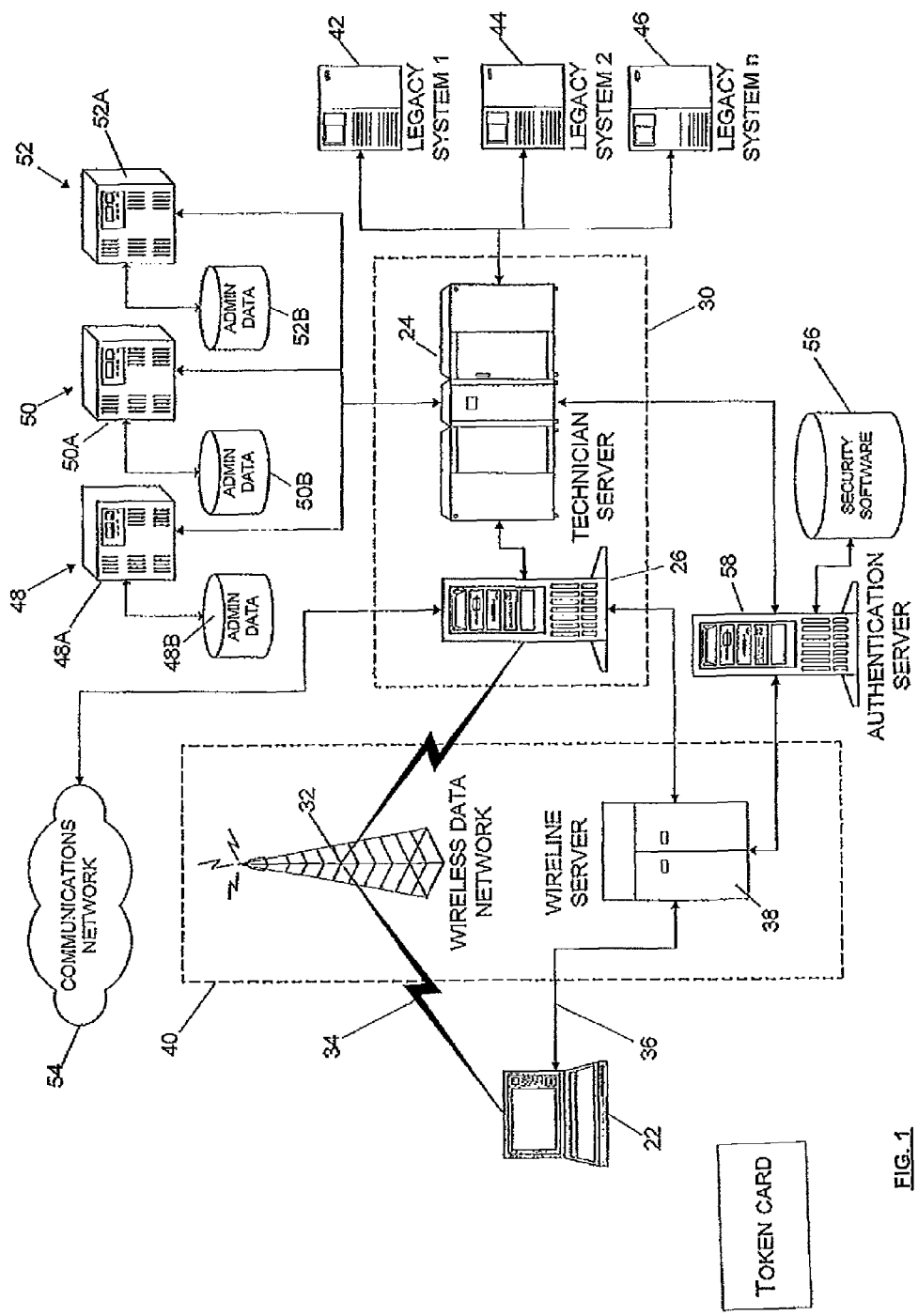
FIG. 1 is a schematic diagram depicting one embodiment of a system for collecting and processing information in a telecommunications system.

Referring now to FIG. 1, a service technician working at a customer service location in a telecommunications system is provided with a technician access device 22. The access device 22 assists the technician in gathering, receiving and transmitting information related to service performed on telecommunications equipment in a telecommunications system.

The access device 22 can be, for example, a wireless personal computer, a laptop, a personal digital assistant (PDA), a wireless pager or any other device suitable for receiving and transmitting data associated with providing service at the customer service location. As used herein, a "computer" may be a microcomputer, minicomputer, laptop, personal data assistant, cellular phone, two-way pager, processor, or any computerized device capable of transmitting and receiving data over a shared network. The access device 22 can also be "ruggedized" (as that term is understood in the art) to resist physical damage during field service operations, for example. In addition, the access device 22 can be a remote and portable computer used by the technician. The access device 22 can include memory for storing certain software applications used in obtaining and communicating data. The memory can be internal or external. The memory can also include any means for storing software, including a hard disk, an optical disk, floppy disk, ROM (read only memory), RAM (random access memory), PROM (programmable ROM), EEPROM (extended erasable PROM), and other like computer-readable media.

The access device 22 is also configured and programmed to permit the service technician to access a technician server 24. The technician server 24 functions as a transaction request broker between a protocol server 26 and one or more other systems operatively connected to the technician server 24. Collectively, the technician server 24 and the protocol server 26 can be considered a systems interface 30 for the system embodiment shown in FIG. 1. Access to the technician server 24 can be enabled through a wireless data network 32 through a radio frequency connection 34, for example. Access to the technician server 24 can also be enabled by a modem connection 36 to a wireline server 38, for example. The wireless data network 32 and the wireline server 38 can collectively be considered a communications network 40 for purposes of illustration and convenience of disclosure of the present methods and systems.

The communications network 40 may be any communications network that permits the access device 22 to access a remote server. The communications network 40 can be a wireline network, wireless or cellular network, satellite network, and so forth. In one aspect of the present methods and systems, the communications network 40 is a Public Switched Telephone Network (PSTN) such as, for example, the BellSouth Communications Network (BSCN). The communications network 40 can also be a wireless communications network such as, for example, the trade-designated CINGULAR wireless network.

As shown in FIG. 1, the protocol server 26 receives and processes communications from the communications network 40. During operation of the access device 22 by a technician or other user, the protocol server 26 processes information transmitted from the access device 22 including, for example, user identification, passwords, radio serial numbers, access device serial numbers, and other data associated with a service technician performing service at a customer location. These and other types of data can be processed by the communications network 40 and the systems interface 30 through a number of legacy systems 42, 44, 46. These other data can include, for example, customer account number, signal decibel level, circuit number, signal response time, circuit test data, as well as many other types of data acquired from service performed on telecommunications equipment at the customer location.

In general, the protocol server 26 provides a protocol and middleware interface between the access device 22 and the technician server 24. The protocol server 26 may, for example, receive user requests or other messages from the access device 22; route requests or messages to the technician server 24; receive responsive information from the technician server 24; and/or route responsive information back to the access device 22. In one embodiment of the present methods and systems, the protocol server 26 can include one or more NT servers running "NetTech" software from Broadbeam Corporation (Princeton, N.J.). In another embodiment, the technician server 24 can utilize UNIX operating system software executed on an Informix database management system. In another aspect, the protocol server 26 can include one or more WINDOWS NT servers (Microsoft Corporation) configured to assign one or more logical ports to transmissions received from the access device 22 through the communications network 40.

In one or more embodiments of the present methods and systems, the communications network 40, the systems interface 30, the access device 22, the software and hardware contained on the access device 22 and other aspects of the present disclosure are provided in accordance with the disclosure of the commonly owned, U.S. patent application Ser. No. 09/343,815, entitled "Systems and Methods for Utilizing a Communications Network for Providing Mobile Users Access to Legacy Systems" ("the '815 application"). In one embodiment provided in accordance with the '815 application, the technician server 24 is provided in connection with the trade-designated "TECHNET" system. In another aspect of the present methods and systems, the technician server 24 can be a server operatively associated with technology having a "TECHACCESS" trade designation (Telcordia Technologies—Morristown, N.J.). In general, the technician server 24 can be a conventional server configured and programmed to receive, process, and/or transmit information in association with the access device 22 and other functionality.

In general, the technician server 24 provides an interface to the legacy systems 42, 44, 46 from which responsive information can be retrieved. The technician server 24 may service requests, generate legacy transactions in connection with one or more of the legacy systems 42, 44, 46 in response to those requests, and/or receive responsive information to be forwarded back to the protocol server 26. In certain aspects of the present methods and systems, the legacy systems 42, 44, 46 are mainframe computer systems that maintain data for the telecommunications entity. According to one or more embodiments of the present methods and systems, the legacy systems 42, 44, 46 can include, for example, one or more of the following systems: a loop facility assignment control system; a loop maintenance operations system; a computer system for mainframe operations; a mechanized loop testing system; a secure network element contract server; a mechanized time reporting system; a work activity statistical sampling plan system; and other telecommunications systems.

In addition, one or more administration systems 48, 50, 52 can be operatively associated with the technician server 24. Each administration system 48, 50, 52 can include a server 48A, 50A, 52A and one or more databases 48B, 50B, 52B that contain information related to performing service at the customer location. Each database 48B, 50B, 52B can include a variety of information related to the technician, the equipment employed by the technician such as the access device 22, for example, and data related to numerous customer service locations and telecommunications equipment employed at the customer locations. Examples of data maintained in the administration systems 48, 50, 52 can include, without limitation, serial numbers of technician access devices; technician names; names of technician supervisors; maintenance center indicia; indicia associated with the version of software employed by access devices; user name and password information; telecommunications equipment information, and the like. In general, each administration system 48, 50, 52 includes hardware and software that interact with the technician server 24 to provide information to one or more technicians at one or more customer service locations.

A plurality of legacy systems 42, 44, 46 and administration systems 48, 50, 52 can be employed by a telecommunications entity in connection with the present methods and systems for authenticated data communication. In one example, a component record keeping system (e.g., a system provided in accordance with "TIRKS" of Telcordia Technologies) can be provided that includes a mainframe computer system configured for recording and managing plant facility records associated with circuit design and special services in the telecommunications entity. In general, the component record keeping system supports circuit design and control, inventory record maintenance, selection and assignment of components, work order generation for installation and maintenance services, as well as various construction, planning, and forecasting functions. In another example, a circuit provisioning group ("CPG") includes personnel for designing special service circuits in connection with the component record keeping system. Functions of CPG include interoffice facility assignment, transmission and signaling equipment placement, generation of test data, trunk group assignment, switch trunk translations, and other like functions. In another example, a facility assignment and control system ("FACS") includes an integrated network of component systems designed to process the assignment of service orders. FACS includes a distributed system for the management of plant assignments and the inventory of cable facilities. In still another example, a loop maintenance operations system ("LMOS") includes functions and storage for loop assignments including means for maintaining customer line records and for entering, processing, and tracking trouble reports. In one aspect, LMOS can be embodied as a system marketed and sold under the "AT&T" trade designation. In another example, a service order communication system ("SOCS") includes a legacy control system that assists with collection, storage, processing, and distribution of service orders to various departments within the telecommunications entity.

In addition, the legacy systems 42, 44, 46 and administration systems 48, 50, 52 can include one or more work and force administration systems ("WFA" systems, e.g., systems provided under the "Telcordia Technologies" trade designation) that include hardware and software applications to help manage tasks and coordinate personnel assignments required to install and repair portions of a telecommunications system, including facilities trunks special service circuits and residential lines. In general, WFA systems manage and automate information required to install and repair facilities, trunks, special services, business/residential lines and other services. WFA systems can be used to coordinate and track installation and maintenance activities of a telecommunications circuit from order to service completion. WFA systems can provide access to detailed circuit records and circuit history data. In one aspect, WFA systems can be employed to automate work assignments for central office technicians in association with service operations for designed circuits, non-designed circuits, and POTS type services.

A user of the access device 22, such as a technician, can access the systems interface 30 through the communications network 40. The technician may log in through the protocol server 26 to the technician server 24 using a user name and other data, such as a password or other identifying data. Once the technician has been authenticated as a legitimate user of the access device 22, a client application session (e.g., a "TECHACCESS" session) can be established and the access device 22 can be connected through the communications network 40 to the systems interface 30. The systems interface 30 permits the access device 22 to make requests for information from the legacy systems 42, 44, 46 and the administration systems 40, 50, 52. The user can make requests by entering commands into the access device 22 that are input to the systems interface 30. After receiving input commands, the systems interface 30 processes the inputs to generate legacy and administrative transactions based on the user requests, receive information from the legacy systems 42, 44, 46 and administration systems 40, 50, 52, and transmit information back to the access device 22. In addition, one or more of the administration systems 48, 50, 52 can interact with the access device 22 such as, for example, to verify user name and password information or to transmit information to the access device 22.

The access device 22 can include software that executes a client application for accessing the systems interface 30. In one aspect, the access device 22 executes the client application disclosed in the "TECHACCESS" client application. The "TECHACCESS" client application includes a graphical user interface (GUI) layer that provides a user interface for receiving requests for information from the user, displaying information retrieved from the legacy systems 42, 44, 46, displaying information transmitted by one or more of the administration systems 48, 50, 52, and other user interface tasks. A technician can make the requests by keyboard entry of inputs, for example, to the client GUI included within the client application. The technician can select a particular operation such as, for example, "Retrieve Customer Information" by using the client application on the access device 22. In operation, the access device 22 can also interact with one or more of the administration systems 48, 50, 52 to obtain data related to service performed at a customer location.

Figure 2:
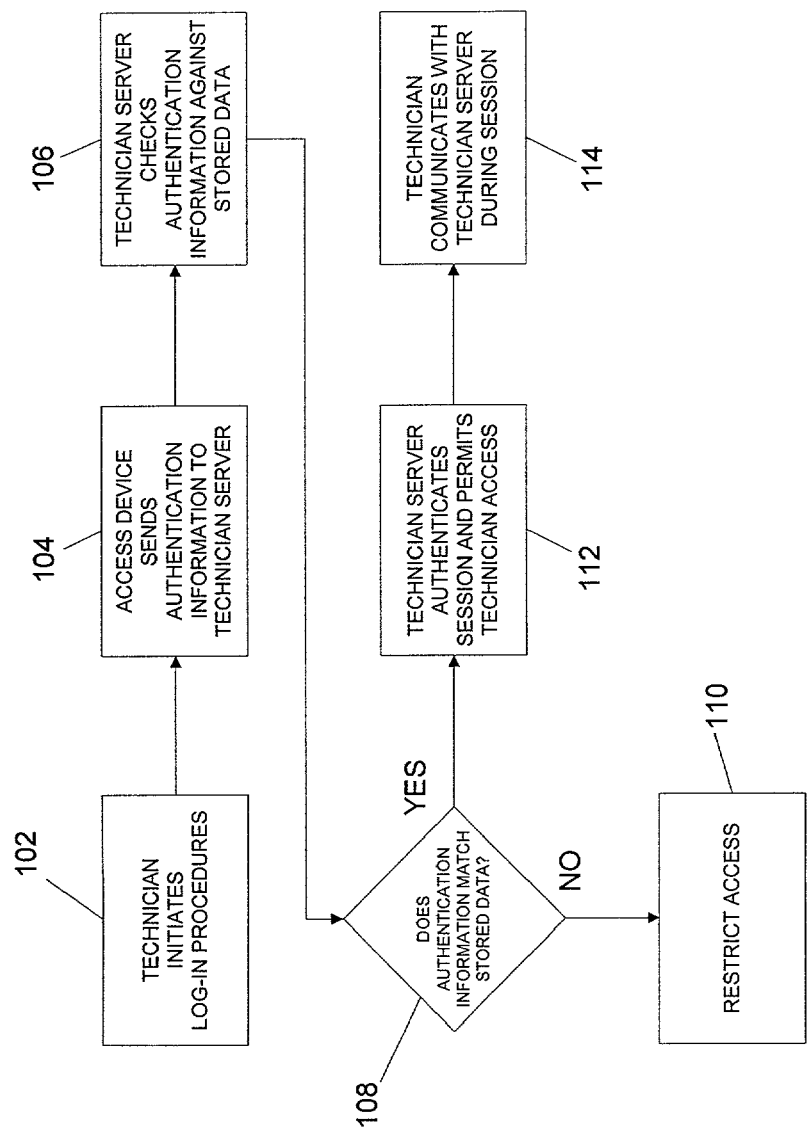
FIG. 2 is a process flow diagram showing one conventional embodiment of a method for authenticating a client application session in connection with service performed in a telecommunications system.
Figure 3:
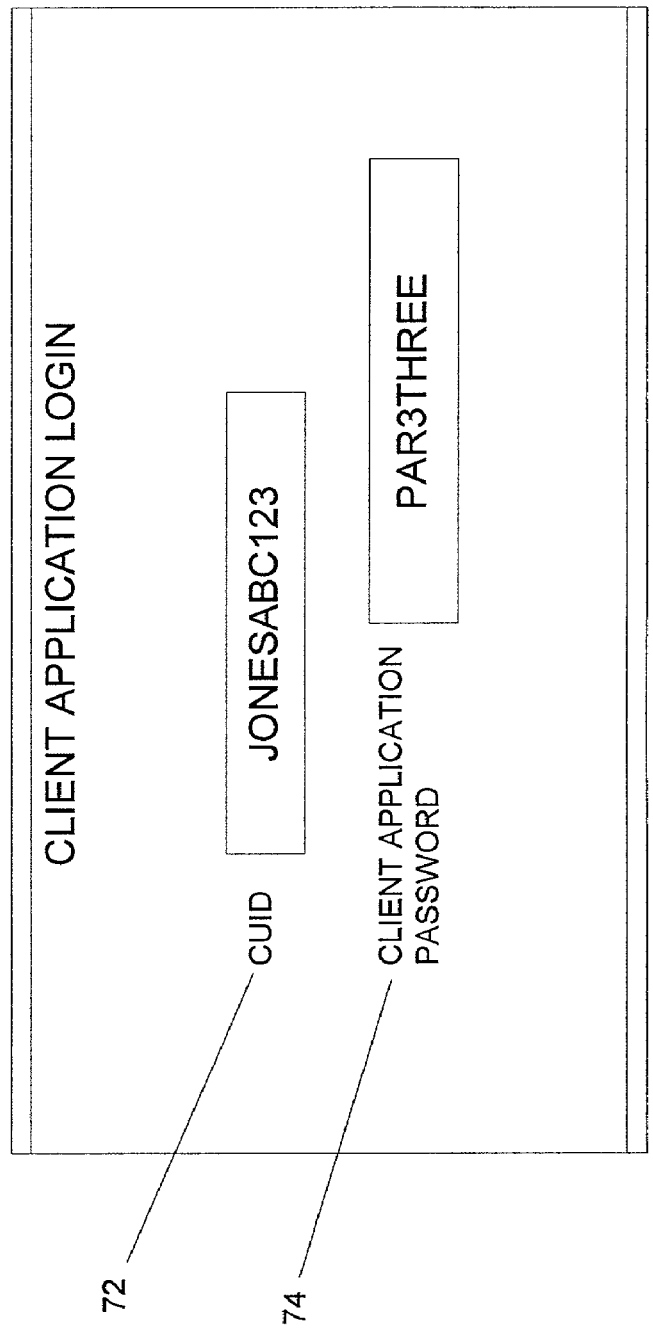
FIG. 3 is a sample screen display of one embodiment of a login screen employed in connection with various embodiments of the present authentication methods and systems.

Referring now to FIGS. 1-3, in one illustrative operation, a technician attempts to log into the technician server 24 wirelessly through the access device 22 in step 102. In step 104, the access device 22 sends a modem serial number, an access device serial number (e.g., in one aspect, each access device 22 can maintain a unique serialized number), a common user identification 72 (CUID) provided by the technician, and an alphanumeric password 74 provided by the technician to the technician server 24. A sample login screen for the access device 22 is shown in FIG. 3. To authenticate the technician, the technician server 24 checks the transmitted serial numbers, the CUID 72, and/or the password information submitted by the technician in step 106 against one or more records contained in one or more of the administrative systems 48, 50, 52 and their associated data storages 48B, 50B, 52B. For example, the technician server 24 may check to verify that the CUID 72 of the technician attempting the login matches one or both serial numbers associated with that technician CUID 72 in the administration systems 48, 50, 52. If the technician server 24 determines in step 108 that a serial number, for example, or other authentication information does not match a particular technician, then access to the technician server 24 through the access device 22 can be restricted to step 110. Another level of security may be provided by employing a closed user group or its functional equivalent through the wireless data network 32. A closed user group permits only those technicians assigned to the closed user group to access the technician server 24. Upon login, the close user group of the wireless data network 32 permits technicians who login wirelessly to be sent only to the technician server 24 and no other location or system.

During this operation, transmissions from the wireless data network 32 are sent to the protocol server 26 prior to their transmission to the technician server 24. The protocol server 26 intercepts the wirelessly transmitted radio signal and assigns the signals with one or more logical ports based on how the signal was transmitted to the protocol server 26. Thus, the protocol server 26 determines whether a user transmitted a signal by wireline or wireless transmission, for example, and also determines how to return information to that particular user. In one aspect, the protocol server 26 certifies that a technician has employed a valid modem serial number and/or a valid wireless modem at login. The protocol server 26 then passes the signal along to the technician server 24, and the protocol server 26 retains information on the location and transmission protocol for return signal transmissions to the technician.

In step 112, if the technician server 24 has authenticated the technician by checking the appropriate access device serial number, CUID 72, and system password information, the technician server 24 returns a signal back to the technician. The return signal may direct the access device 22 to display a screen that is the primary client application screen shown once a successful login is accomplished. The technician may now proceed in step 114 to access one or more of the administration systems 48, 50, 52 or legacy systems 42, 44, 46, request a job, or perform other service related tasks through the wireless connection of the access device 22 to the technician server 24. It can be seen that the technician server 24 acts as a transaction request broker between the access device 22 and other functionality, such as the legacy systems 42, 44, 46 and administration systems 48, 50, 52, operatively associated with the technician server 24.

With particular regard to wireless communications, however, the authentication level of the process described in FIG. 2 is a relatively low level of authentication. The method illustrated in FIG. 2 permits technicians to access the technician server 24 wirelessly, but not other functionality such as a communications network 54, which may include access to the Internet or an intranet of the telecommunications entity, for example.

Figure 4:
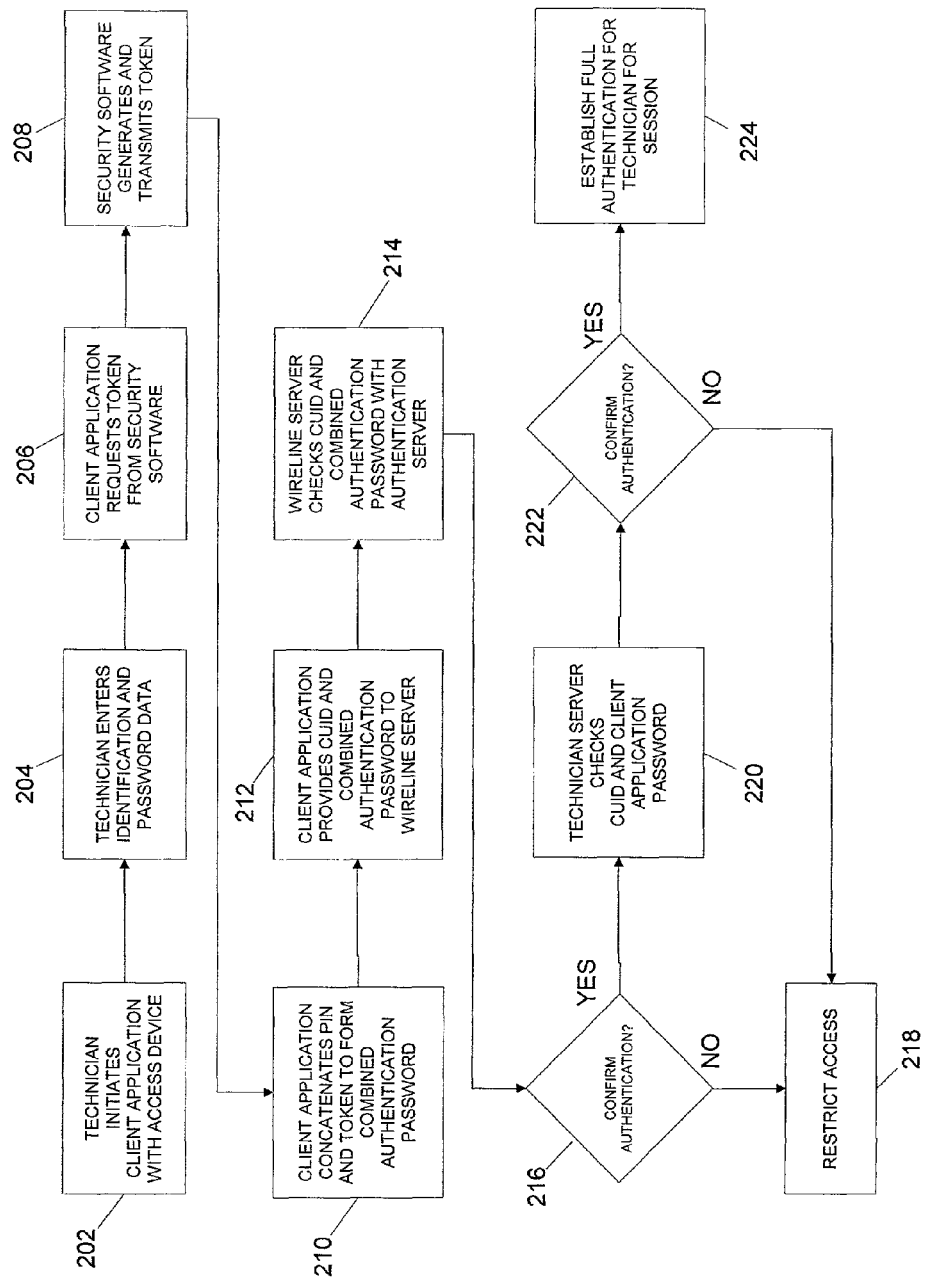
FIG. 4 is a process flow diagram illustrating one embodiment of a method for authentication in a telecommunications system.
Figure 5:
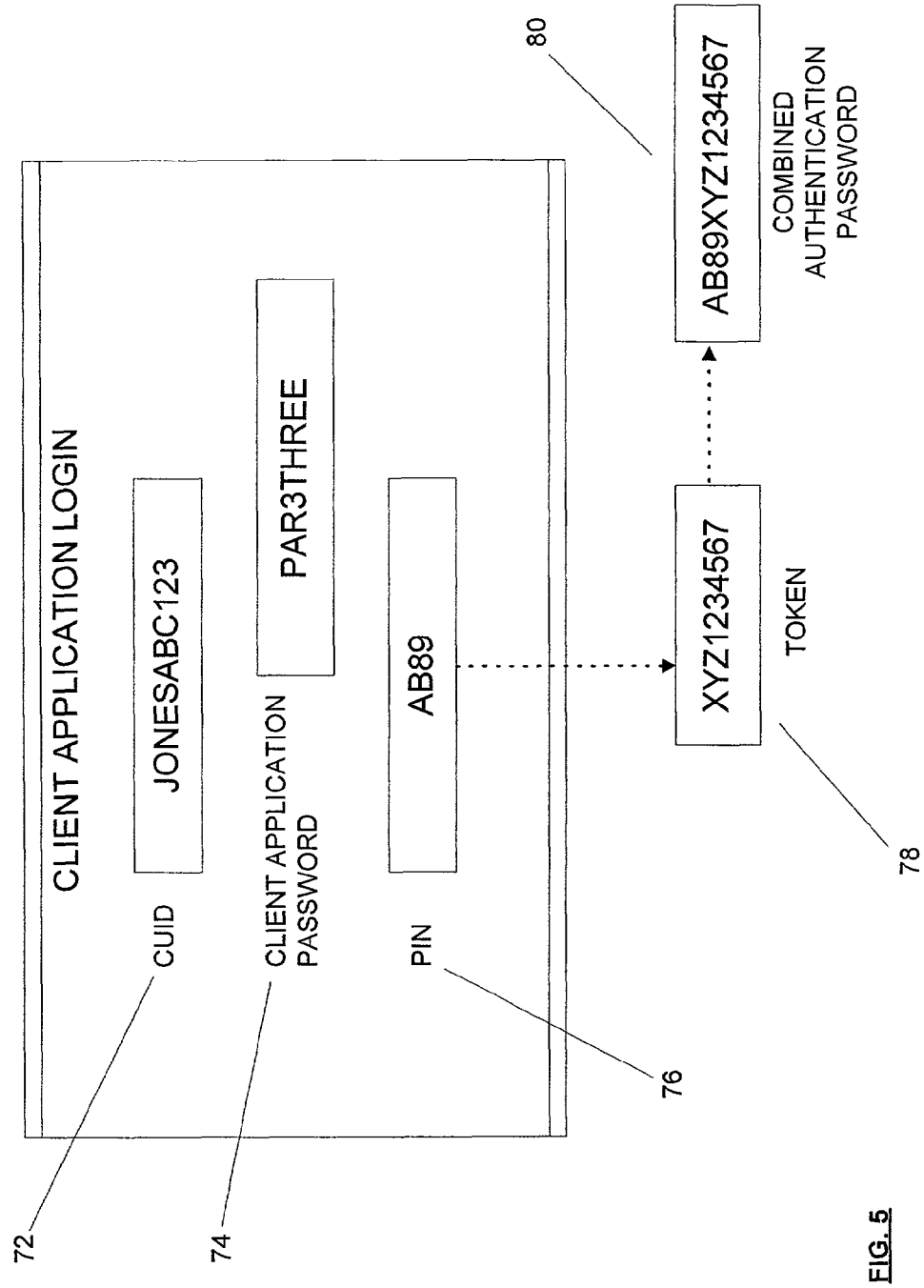
FIG. 5 is a sample screen display of one embodiment of a login screen employed in connection with various embodiments of the present authentication methods and systems; and, FIG. 6 is a process flow diagram illustrating one embodiment of a method for wireless authentication in a telecommunications system.

Referring now to FIGS. 1, 4 and 5, in one embodiment of the present methods and systems, a technician initiates login procedures through a client application executed on the access device 22 in step 202. In one aspect, this client application may include one or more functions of the "TECHACCESS" client application. On a login screen (such as the illustrative screen display of FIG. 5), the client application requires the technician to enter a personal identification number 76 ("PIN"). The PIN 76 can be of any suitable length, and in one embodiment the PIN 76 includes a combination of any four to six lower case or upper case alphanumeric characters. In another embodiment, the PIN 76 can be entered in step 204 in addition to a common user identification 72 ("CUID") and a client application password 74 entered by the technician. The client application substantially automatically requests a token 78 for the transaction in step 206 by performing an application program interface ("API") call to security software 56 stored on an authentication server 58. The token 78 can be generated and transmitted in step 208 by a conventional security software program such as the trade-designated "SOFTPC" software of RSA Security. In one aspect, full authentication for remote or wireless login situations requires use of a one-time user token. It can be appreciated that a token is a program sequence of random numbers, as is known in the art, whose generation can be synchronized between the authentication server 58 and the access device 22 and/or a token card employed by the technician.

In step 210, the client application concatenates the PIN 76 with the token 78 to form a combined authentication password 80. The client application provides the technician CUID 72 and the combined authentication password 80 to the wireline server 38 in step 212. The wireline server 38 checks the technician CUID 72 and the combined authentication password 80 with the authentication server 58 in step 214. In step 216, the wireline server 38 provides an indication of either authentication or rejection (in step 218) to the client application. If the CUID 72 and the combined authentication password 80 are confirmed by the authentication server 58, the technician server 24 then checks the technician CUID 72 and the client application password 74 in step 220. If the CUID 72 and combined authentication password 80 are authenticated by the authentication server 58, and the CUID 72 and the client application password 74 are authenticated by the technician server 24 in step 222, then full authentication login is established in step 224 for the technician to access the technician server 24 and other functionality, such as the communications network 54, for example. In one aspect, the conditions of restricting user access, such as may be occasioned by repeated login failures or by unauthorized attempts to login through the access device 22, can be controlled by the authentication server 58.

Figure 6:
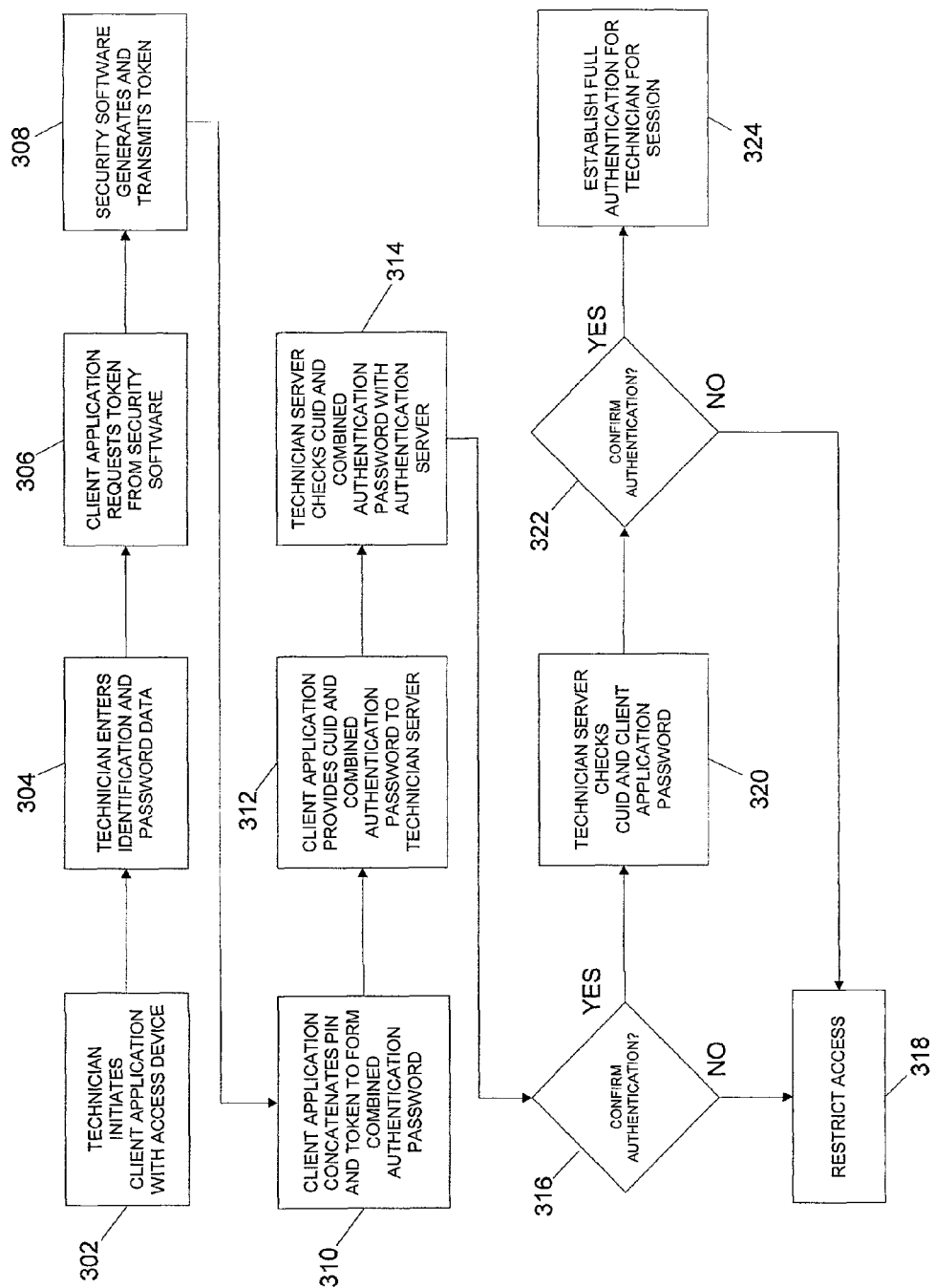

Referring now to FIGS. 1, 5 and 6, in another embodiment of the present methods and systems, a technician initiates a client application wirelessly in step 302 through the access device 22. In one aspect, this client application includes one or more functions of the "TECHACCESS" client application. On a login screen (as shown in FIG. 5), the client application requires the user to enter a personal identification number 76 ("PIN"). The PIN 76 can be of any suitable length, and in one embodiment the PIN 76 includes a combination of any four lower case or upper case alphanumeric characters. In one aspect, the PIN 76 can be entered in step 304 in addition to a common user identification 72 ("CUID") and a client application password 74 entered by the technician. The client application substantially automatically requests a token 78 for the transaction in step 306 by performing an API call to security software 56 stored on the authentication server 58. In a wireless communication, the token 78 is provided to the client application by operative interaction between the technician server 24 and the authentication server 58. The token 78 can be generated and transmitted in step 308 by a conventional security software program such as the trade-designated "SOFTPC" software of RSA Security. In one aspect, full authentication for remote or wireless login situations requires use of a one-time user token. It can be appreciated that a token is a program sequence of random numbers, as is known in the art, whose generation can be synchronized between the authentication server 58 and the access device 22 and/or a token card employed by the technician.

In step 310, the client application concatenates the PIN 76 with the token 78 to form a combined authentication password 80. The client application provides the technician CUID 72 and the combined authentication password 80 to the technician server 24 in step 312. The technician server 24 checks the provided CUID 72 and combined authentication password 80 in step 314 by accessing the authentication server 58. In step 316, the authentication server 58 provides an indication of authentication or rejection (in step 318) for access to the telecommunications system. If the CUID 72 and the combined authentication password 80 are authenticated by the authentication server 58, the technician server 24 may then check the technician CUID 72 and the client application password 74 in step 320. If both the CUID 72 and combined authentication password 80 are authenticated by the authentication server 58, and if the CUID 72 and client application password 74 are authenticated by the technician server 24 in step 322, then full authentication login is established for the technician in step 324 to access the technician server 24 and other functionality, such as the communications network 54, for example. In one aspect, the conditions of restricting user access, such as may be occasioned by repeated login failures or by unauthorized attempts to login through the access device, can be controlled by the authentication server 58. Therefore, in at least one aspect of the present methods and systems, the authentication server 58 may communicate with the technician server 24 prior to authentication of a request for system access made by a wireless user, for example.

In one embodiment, full authentication permits a wireless user to suspend service operations on the access device 22 and perform communications network 54 transactions, for example. For security reasons, it may be a requirement that full authentication be established for independent, separate sessions of the client application. Once the technician voluntarily logs out, or is automatically logged out, of a first client application session, for example, a subsequent session may require full authentication to permit the technician to access communications network 54 functions such as the Internet or intranet, for example. In addition, in combination with the methods and systems described herein, conventional procedures for expiration and renewal of PIN's, and passwords, and other login information can be required by the telecommunications entity to promote secure access to the technician server 24 and other functions provided by the telecommunications entity.

The benefits of the present methods and systems for performing authenticated communications in a telecommunications system are readily apparent. The password and token procedures described herein are generally useful for applications involving remote login by users of the telecommunications system. In addition, the present methods and systems are suited for both wireline and wireless communications with the telecommunications system. Such methods and systems are beneficial for use in connection with the architecture associated with communications between an access device and a technician server pursuant to performing service operations for a telecommunications entity. The present methods and systems provide the security of full authentication and the flexibility of access to additional functionality for service technicians engaged in wireless or wireline communications within a telecommunications system.

The term "computer-readable medium" is defined herein as understood by those skilled in the art. It can be appreciated that various method steps described herein may be performed, in certain embodiments, using instructions stored on a computer-readable medium or media that direct a computer system to perform the method steps. A computer-readable medium can include, for example, memory devices such as diskettes, compact discs of both read-only and writeable varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present methods and systems.

Examples presented herein are intended to illustrate potential implementations of the present telecommunication method and system embodiments. It can be appreciated that such examples are intended primarily for purposes of illustration. No particular aspect or aspects of the example method and system embodiments described herein are intended to limit the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A computer-assisted method for authenticating at least one service-related communication with a technician in a telecommunications system, the method comprising:
   receiving by an application a password and a user identification from an access device employed by the technician;
   in response to receiving the password and the user identification, requesting a token by the application, the application performing an application program interface call to security software stored on an authentication server;
   receiving a token from the authentication server by the application;
   combining by the application the token with the password to form a combined authentication password by the application, wherein combining concatenates the token with the password;
   in response to combining the token with the password, providing by the application the user identification and the combined authentication password to the authentication server to be authenticated through at least a technician server, wherein after providing the user identification and the combined authentication password to the authentication server to be authenticated, providing an indication of one of the following: authentication and rejection for access to the telecommunications system; and
   permitting access by the technician to the telecommunications system subject to an authentication of at least the combined authentication password, wherein permitting access by the technician comprises:
      determining if the user identification matches a valid access device serial number;
      if the user identification does not match the valid access device serial number, restricting access to the technician server; and
      if the user identification matches the valid access device serial number, authenticating a session and allowing the technician access to the technician server, wherein allowing the technician access to the technician server comprises permitting the technician access to at least one closed user group to which the technician is assigned.

2. The method of claim 1, wherein the password includes a client application password.

3. The method of claim 1, wherein permitting access includes permitting access to a communications network.

4. A tangible, non-transitory computer-readable medium comprising instructions that, when executed by a processor, cause the processor to perform a method for authenticating at least one service-related communication with a technician in a telecommunications system, the method comprising:
   receiving by an application a password and a user identification from an access device employed by the technician;
   in response to receiving the password and the user identification, requesting a token by the application the application performing an application program interface call to security software stored on an authentication server;
   providing the token through an operative association at least between an authentication server and a technician server;
   combining by the application the token with the password to form a combined authentication password by the application, wherein combining concatenates the token with the password;
   in response to combining the token with the password, providing by the application the user identification and the combined authentication password to the authentication server to be authenticated through at least a technician server, wherein after providing the user identification and the combined authentication password to the authentication server to be authenticated, providing to the application an indication of one of the following authentication and rejection;

permitting access by the technician to the telecommunications system subject to an authentication of at least the combined authentication password, wherein permitting access by the technician comprises:

determining if the user identification matches a valid access device serial number;

if the user identification does not match the valid access device serial number, restricting access to the technician server;

if the user identification matches the valid access device serial number, authenticating a session and allowing the technician access to the technician server, wherein allowing the technician access to the technician server comprises permitting the technician access to at least one closed user group to which the technician is assigned.

5. The tangible, non-transitory computer-readable medium of claim 4, wherein the password includes a client application password.

6. The tangible, non-transitory computer-readable medium of claim 4, wherein the permitting access includes permitting access to a communications network.

7. The method of claim 1, wherein the identification indication comprises a serial number of the access device.

8. The method of claim 1, wherein the identification indication comprises a valid modem serial number.

9. The method of claim 1, wherein the token is a one-time user token.

10. The method of claim 1, further comprising verifying that the user identification, provided by the technician, matches an identification indication of the access device, wherein the identification indication comprises the valid access device serial number and the user identification comprises an alphanumeric password.

* * * * *